April 1, 1969   J. F. DREYER ET AL   3,436,353
PHOTOTROPIC COMPOSITIONS
Filed Oct. 22, 1959

INVENTORS
John F. Dreyer
BY  Donald H. Baltzer

Curtis, Morris & Safford
ATTORNEYS

United States Patent Office 3,436,353
Patented Apr. 1, 1969

3,436,353
PHOTOTROPIC COMPOSITIONS
John F. Dreyer and Donald H. Baltzer, Cincinnati, Ohio, assignors to Polacoat Incorporated, Blue Ash, Ohio
Filed Oct. 22, 1959, Ser. No. 847,926
Int. Cl. C09k *1/02;* G02b *1/04;* G03c *1/00*
U.S. Cl. 252—300                          1 Claim

ABSTRACT OF THE DISCLOSURE

Phototropic chemical systems and optical devices utilizing such systems. A normally colorless phototropic composition comprising several bis(p-aminophenyl)vinyl carbonium dyestuffs forming a neutral shade when irradiated.

---

This invention relates to chemical phototropy, and relates in particular to phototropic combinations of matter, to optical systems and devices using phototropic effects, and to methods of making the same.

Although chemical phototropy is known, it has not heretofore been found practical use for control of light. We have now found that it can, by suitable materials and combinations as herein disclosed, be utilized for controlling intensity of light in optical systems without seriously distorting color.

By "chemical phototropy" is meant the phenomenon in which the influence of light or other radiant energy brings about a reversible change in absorption and/or reflection of radiant energy by a chemical. Wavelengths throughout the spectrum, including the infra-red, visible, and ultraviolet, can be effective in bringing about a phototropic reaction. At present, the greatest utility of these reactions is in the control of absorption of wavelengths in the visible spectrum (4000–7000 A.). These phototropic reactions may be those in which a colored material converts to a lighter colored or colorless material under the influence of radiation, or those in which a colorless or light-colored material becomes darker or opaque under the influence of light.

Reactions of both classes are of particular interest for the manufacture of devices, which may be referred to as "light valves," which utilize the intensity of a light source to change the percentage transmission, by the device, of light from a source. For example, phototropic materials can be used in the manufacture of sun glasses and eye shields, photographic filters, automobile and aircraft windows, fenestration for home, commercial and factory use, and, in many other instruments and special applications such as memory devices, trackers, television tubes, three-dimensional displays, etc.

A wide variety of materials—both organic and inorganic—show phototropic reactions. Among the phototropic organic substances are the anils, or Schiff bases, which are condensation products of aldehydes and primary amines.

Sulfoxides such as 1-acetylaminonaphthyl-4-disulfoxide are also phototropic.

Numerous fulgides are phototropic, as well as fulgic acid, and salts and esters of fulgic acids. Examples of such materials are diphenyl-fulgic acids, etc. Salts and esters include sodium diphenyl-fulgide, etc.

Numerous hydrazones have been found to be phototropic, including the reaction products of naphthyl hydrazine with aldehydes, esters, ketones and diketones including benzaldehyde and cinnamic aldehyde, etc.

Various osazones are also phototropic.

The semicarbazones, phenyl-semicarbazones, diphenyl-semicarbazones, and thio-semicarbazones of cinnamaldehyde, etc., are phototropic.

Phototropic stilbene derivatives include: diformyl-4, 4-diamino-stilbene-2,2'-disulfonic acid, etc.

Other organic compounds which are phototropic are anhydrous quino-quinoline hydrochloride, N-(5-bromo-salicylidene)benzylamine, N-(5-bromo-salicylidene)methylamine, tetrachloro-keto-naphthalene, spirans, iso-nicotinic acid-o-nitrobenzylidene hydrazide, the oxide of 2-chloro-2-ethyl-3-hydroxy-3-phenyl-hydrindone, p-diethyl- and p-dimethyl- amino-phenyl-imino-camphor, brucine salts of chloro-nitro-methionic and bromo-nitro-methionic acids, diphenyl-acyl-diphenyl-methane, and p- and o-benzylidenedioxy-p-benzoin.

Some of the aforementioned materials are phototropic as solids. Many organic materials exhibit phototropy when in solution. Among these materials are naphthyl-amino-camphor in methanol, ethanol, acetone, ether, bromoform, chloroform, or chloral alcoholate, etc. Tetrahydro-naphthylaminocamphor and m-phenylene-bis aminocamphor are phototropic in chloroform, as is chlorophyll in methyl alcohol. 10,10'-dihydroxy-diphenyl-9,9-diamine is phototropic in ether and benzine. Aminoazo dyes such as 4-amino-azobenzene is phototropic in ethyl alcohol, acetylcellulose, and ethylcellulose. Malachite green carbinol and crystal violet carbinol are phototropic in alkaline ethyl alcohol. Auramine cyanide, brilliant green cyanide, crystal violet cyanide, malachite green and pararosaniline cyanides are phototropic in ethyl alcohol. Sulfites of crystal violet, malachite green, methyl violet, pararosaniline hydrochloride, and rosaniline are all phototropic in water containing sulfur dioxide. A yellow aqueous solution of potassium ferrocyanide containing a little phenolphthalein turns red under light, and reverts to yellow in the dark. Equimolar mixtures of di-phenyl-mono-biphenyl-methane and diphenyl-mono-bi-phenyl-methyl chloride are phototropic.

Among inorganic materials which are phototropic are cuprous chloride and bromide, bismuth oxalate, lithium imide, cadmium iodide, minerals such as pink hackmanite and sodalite, and alkaline earth sulfides containing manganese or zinc salts as activators. Barium, calcium and strontium titanates containing small amounts of divalent iron, divalent tin, pentavalent antimony or pentavalent vanadium show phototropy.

Phototropic mercury salts include: $HgClCNO$;

$HgBrCNO$; $HgICNO$; $HgClCNS$; $HgICNS$; $HgClCNSe$; $HgBrCNSe$; $HgICNSe$; $HgHSCNS$; $HgHSCNSe$; $HgCl_2 \cdot 2HgS$; $HgBr_2 \cdot 2HgS$; $HgI_2 \cdot 2HgS$; $HgCl_2 \cdot 2HgSe$; $HgBr_2 \cdot 2HgSe$; $HgI_2 \cdot 2HgSe$; $Hg(SCN)_2 \cdot 2HgO$; $Hg(SCN)_2 \cdot 2HgS$; $Hg(CNSe)_2 \cdot 2HgS$; $IHgSSHgI$; $HgBrCl$; $HgIBR$; $HgICl$ and certain mixtures of $Ag_2S \cdot HgI_2$.

$TiO_2$ undergoes reversible color changes in the presence of traces of $Fe_2O_3$.

Several mechanisms are operative in producing phototropy in compounds like those mentioned above, these can be divided into several classes: (1) change from trans to cis, (2) salt isomerization, (3) ring opening and closing, (4) removal of electron from its ground state, (5) oxidation-reduction.

The stilbenes, for example, are phototropic because of shifts between cis- and trans-isomers having unequal possibilities for resonance.

Triphenyl methane dyes such as ethyl violet go from the cyanide to the nitride form and back and form one salt isomerization class; another class is formed by the polymethine dyes.

Spiranes are phototropic due to opening and closing of a ring structure.

Sodalite $3(Na_2O-Cl_2O-2SiO_2)$ with small amounts of NaCl and/or $Na_2S$ is phototropic due to impurity *f* centers.

Redox photopy requires the presence of more than isomeric species of the same molecule, since a transfer of atoms between different substances is involved. In the "light reaction," or reaction triggered by the absorption of activating radiation, one substance present is oxidized and another reduced, the energy for the reaction being supplied by the activating radiation. The "dark reaction," or reaction occurring out of the presence of the activating source, is a return to the status quo ante by reduction of the oxidized compound, and oxidation of the compound reduced in the light reaction.

In order that the phototropic redox system be non-fatiguing, reducing agents which are readily re-reduced after oxidation are used. Preferred materials of this type are the inorganic oxychlorides, such as arsenic-, antimony-, and selenium-oxychloride, various chelated compounds of iron, cobalt, nickel, manganese, etc., such as cobalt salicylaldehyde ethylene di-amine, and urbenes, such as rubrene.

A particularly advantageous embodiment of the present invention is the incorporation of phototropic materials into a film with which the phototropic material reacts reversibly in exhibiting phototropy. Other embodiments hold the photoropic materials in a sandwich or liminate, still others hold such materials distributed in a carrier substrate, e.g., a transparent plastic, plate, lens or film. Numerous specific examples of novel materials of this type can be given.

EXAMPLE 1

A colorless film which turns blue rapidly on exposure to sunlight is prepared by making a concentrated aqueous solution of citric acid containing ammonium molybdate. The solution is cast as a film and water is evaporated by warming or aspiration. The light reaction is a conversion of the colorless film to a bright blue. Exposure to infra-red or keeping in the dark causes reversal to the colorless form.

The amount of molybdate salt employed depends on the degree of color intensity desired. Concentrations of 10 percent of weight, based on the citric acid, are particularly satisfactory, but concentrations as low as 1 percent or as high as 25 percent or more can be employed.

EXAMPLE 2

Another colorless phototropic film which turns blue in sunlight is made by casting from an aqueous solution of polyvinyl alcohol containing 10 percent of ammonium molybdate slightly acidified with sulfuric acid to give a pH of about 4.8. As in Example 1, the phenylvinyl alcohol solutions are preferably concentrated and the ammonium molybdate is present in concentrations between 1 percent and 25 percent or more, preferably at about 10 percent by weight based on the polyvinyl alcohol. Generally the pH of the casting solution is kept between 1 and 7.

EXAMPLE 3

A phototropic film stable to visible light, but which changes from yellow to blue under ultraviolet and from blue to yellow under infra-red is made from phosphomolybdic acid in water-insoluble cellulose nitrate. The acid is conveniently dissolved in ethyl alcohol and mixed with an alcohol-acetone solution of the cellulose nitrate. Ten parts by weight of the acid to 100 parts of cellulose nitrate give an especially good film, but the concentrations, as in the previous examples, are not critical. The film can be cast on a glass or plastic base, and a film of "Mylar" (polyethylene glycol terephthalate) is a particularly desirable base.

The use of phospho-molybdic acid is advantageous because this material is soluble in solvents other than water and alcohol, e.g., ketones. The incorporation of the material in films of water resistant resins is thus possible. Other double acids can be used to modify the phototropic color changes observed. Double acids of tungsten, vanadium, niobium or tantalum are useful. The phospho acid portion of the molecule can be replaced by other oxy acids, such as those of boron, silicon, germanium, titanium, thallium, zirconium, arsenic, manganese, and vanadium. All these materials are preferably cast from an acid solution having a pH between 1 and 7.

Although the embodiment using a reactive resinous film for the phototropic substance is of particular interest, these substances can be cast in nonreactive films, such as those of polyacrylate and polymethacrylate polymers. In such instances, a second reactive component is incorporated, such as sugar, a glycol, or other organic hydroxy-containing reducing agents such as the "Ethomeens," which are solid or liquid materials produced by reacting ethylene oxide with aliphatic primary, secondary, and tertiary amines having from 8 to 18 carbon atoms, and are marketed commercially, or a multivalent inorganic oxide in a lower valence state. A combination of about equal weights of phospho-tungstic acid, phospho-molybdic acid, and arsenous oxide, acidified with HCl to a pH between 1 and 7, and cast into polymethylmethacrylate films is exemplary of such embodiments. Molybdo-tungstic acid incorporated with a reducing agent, such as methyl cellulose is also a particularly advantageous combination.

All of the light-reactions of the films disclosed in Examples 1–3 above can be speeded by addition to the film of trace quantities (less than 1 percent) of sensitizers such as uranyl nitrate or by pH adjustment with nitric acid.

Particularly useful sensitizers are those wherein the absorption is at a longer wavelength than that of the phototropic material being sensitized. For example, with Magenta the sensitive range is in the ultra-violet between 2200 and 3300 angstroms. A material which transmits in this range but absorbs in the range between 3300 and the visible at 4000 A. is most effective. Acridine in methanol, for example, has greater absorption at 3600 than at 2800 A.

A problem which arises in employing phototropic materials is that the light absorbing forms of these materials are colored. For many applications, it is desirable to have a colorless form produced by the light reaction. Heretofore, no single organic materials have been known to show phototropy between a colorless and neutral colored form.

According to the present invention, this problem has been solved by employing mixed materials to broaden the absorption spectrum and give neutral grey or dull colors.

Such a combination of materials is generally made from compounds of the same chemical class. Such combinations advantageously are made from compounds which are phototropic in the same environment, which do not interact chemically to form new compounds, and which have some portions of their respective absorption spectra overlapping. Compositions of this type can be made by combining various dyestuffs, for example, the triphenyl methane dyes.

The following triphenyl methane dyes have been found to be phototropic.

| Color Index first edition No.: | Name |
| --- | --- |
| 657 | Malachite Green. |
| 662 | Brilliant Green B. |
| 658 | Brilliant Blue. |
| 666 | Acid Green L Extra. |
| 667 | Fast Acid Green. |
| 669 | Light Green SF. |
| 677 | Magenta Red Fuchsin Base. |
| 678 | Fuchsin NB. |
| 679 | Iodine Violet. |
| 680 | Methyl Violet. |
| 681 | Crystal Violet. |
| 682 | Ethyl Violet. |
| 686 | Iodine Green. |
| 688 | Methyl Blue. |
| 692 | Red Violet. |
| 693 | Red Violet 5R. |
| 698 | Wool Violet 4BN. |

Combinations of these dyes can be used to give phototropy productive of neutral or dull colors.

EXAMPLE 4

15 drops of a 1 percent solution of Malachite Green in ethylene glycol monomethyl ether and 15 drops of Crystal Violet (1 percent in ethylene glycol monoethyl ether) were mixed with 40 drops of a 0.25 percent aqueous solution of KCN and diluted with alcohol up to 100 ml. The mixture is kept in the dark for one hour, and then is a colorless solution. On exposure to sunlight for 1½ minutes, a dark blue-green color forms. In the absence of sunlight, the color fades completely in about 15 minutes. The substitution of either Magenta Red Fuchsin Base (Color Index 677), or Auramine (Color Index 655) gives a grey shade.

The dyes are generally first dissolved in a polar solvent such as ethanol, methanol ethylene glycol or ethylene glycol monomethyl ether and are used in the presence of an acetate, hydroxide or cyanide, such as potassium hydroxide.

By controlling the proportion of dye, and inorganic component hydroxyl containing liquid, the sensitivity of both forward and back reaction can be adjusted. For example, additional salt such as KCN will speed up the back reaction. The optimum ratio of organic hydroxyl containing liquid (for example, the plasticizer Dowanol 33B) to dye is necessary for deepest color formation.

In some instances the back reaction can be controlled by application of light of longer wavelength than that of the forward action light. Visible light for example increases the speed of the back reaction for salicylidine aniline.

In most instances raising the temperature will increase the back reaction without markedly effecting the forward reaction.

The dyes need not be confined to use in solution and can be incoporated into a film. Such a film preferably is one of a material containing polar groups, such as films of polyvinyl alcohol, polyvinyl butyral, or methyl methacrylate. The films can be cast on glass or plastic, and can be made into laminates.

Dyes other than the triphenylmethane dyes can be combined to give neutral shades upon phototropic reaction. For example, dyes of the homologous series of polymethine dyes

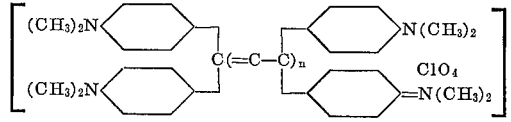

where $n=1$, 2 or 3 can be combined. A combination of about equal parts of the three dyes produce a dull neutral blue. For phototropic applications, the dyes are used in their leuco cyanide, borate, or carboxy form. The dyes can be used in solution, or incorporated in a film forming vehicle as described earlier.

The combination of KOH plus the polymethine dye, 1,3 - bis(p-dimethylaminophenyl) - 1,3 - bis(phenyl)vinyl carbonium perchlorate in ethylene glycol monomethyl ether proved to be for a single phototropic dye unusually neutral in color. The 1,5-analogue instead of the 1,3 is slightly pinker.

The following dyes are compatible as a phototropic mixture in ethylene glycol monomethyl ether plus sodium borate.

Polymethine dye mixtures that gave a very nearly neutral color by visual and absorption spectral examination. A mixture of: 1,3-bis(p-dimethylaminophenyl)-1,3-bis-(phenyl)vinyl carbonium perchlorate; 1,1,3-tris(p-dimethylaminophenyl)vinyl carbonium perchlorate; and 1,5 - bis(p-dimethylaminophenyl) - 1,5 - bis(phenyl)divinyl carbonium perchlorate gave a fairly neutral color which was improved by the addition of 1,7-bis(p-dimethylaminophenyl)-1,7 - bis(phenyl)trivinyl carbonium perchlorate.

The structure given represents only one of the resonance forms of each compound. The methines, particularly these polymethines, have greater solubility under ultra-violet light, faster back reaction rates, and as a whole are more uniform in their reaction rates and therefore are better for mixtures especially in giving stable color or colorless character and extend into the near infrared.

It was found possible to mix two types of dyes of the same class. For example, a triphenyl methane dye can be mixed with a polymethine dye by making two separate phototropic solutions using a common solvent and with the dye in each solution in its optimum concentration, then the two are combined.

For example, Malachite green leuco KOH was mixed with 1,1,5,5-tetrakis(p-dimethylaminophenyl)divinyl carbonium perchlorate leuco KOH to form a dark blue phototropic solution with ethylene glycol monomethyl ether as the common solvent.

Other solvents can be used with the polymethine dyes, for example, they are nicely soluble in ethylene dichloride and can be combined with KOH by dissolving the KOH in methanol.

The following polymethine dyes were tested and found to be phototropic:

1,1,5,5-tetrakis (4-(N,N-dimethylamino)phenyl)divinylcarbonium perchlorate 1,1,7,7-tetrakis (4-(N,N-dimethylamino)phenyl)trivinylcarbonium perchlorate 1,3-bis-(N,N-dimethylamino)phenyl)-1,3-bis(phenyl) vinylcarbonium perchlorate 1,5-bis(N,N-dimethylamino)phenyl)-1,5-bis(phenyl) divinylcarbonium perchlorate 1,7-bis(4-(N,N-dimethylamino)phenyl)-1,7-bis(phenyl) trivinylcarbonium perchlorate 1,1,3-tris(4-(N,N-dimethylamino)phenyl)vinylcarbonium perchlorate 1,5-bis(4-N,N-dimethylamino)phenyl)-1,5-bis(4-chlorophenyl)divinylcarbonium perchlorate 1,5-bis(4-(N,N-dimethylamino)phenyl)-1,5-bis(phenyl) divinylcarbonium p-toluenesulfonate 1,1,5,5-tetrakis(4-(N,N-dimethylamino)phenyl)divinylcarbonium p-toluenesulfonate 1,7-bis (4-(N,N-dimethylamino)phenyl)-1,7-bis(4-chlorophenyl)trivinylcarbonium perchlorate 1,1,5,5-tetrakis(4-(N-benzyl-N-methylamino)phenyl) divinylcarbonium perchlorate 1,1,5,5-tetrakis (4-(N,N-dimethylamino)phenyl)divinylcarbonium heptafluorobutyrate 1,1,5,5-tetrakis(4-(N,N-dimethylamino)phenyl)divinylcarbonium ethanesulfonate 1,1,5,5-tetrakis(4-N,N-dimethylamino)phenyl)divinylcarbonium diphenyl-4,4'-disulfonate 1,1,5,5-tetrakis(4-(N,N-dimethylamino)phenyl)divinylcarbonium-trifluoracetate 1,1,5,5-tetrakis(4-(N,N-dimethylamino)phenyl)divinylcarbonium dodecylbenzenesulfonate 1,5-bis(4-(N,N-dimethylamino)phenyl)-1,5-bis(phenyl) divinylcarbonium diphenyl-4,4'-disulfonate 1,5-bis(4-(N,N-dimethylamino)phenyl)-1,5-bis(phenyl) divinylcarbonium orthophosphate 1,5-bis(4-(N,N-dimethylamino)phenyl)-1,5-bis(phenyl) divinylcarbonium zinc chloride complex.

In place of the cyanide, borate, or carboxylate, amines such as tetraethanol amine can be used as the bleaching agent.

In another embodiment of the present invention, it has been found that the use of an ultra-violet filter with a phototropic filter produces unexpected effects on the transmission properties of the phototropic filter. For example, in a phototropic filter made by casting one of the aforementioned film-forming phototropic compositions onto a glass plate, the optical density of the filter is proportional to the intensity of the activating light. The percent transmission of the filter is an inverse logarithmic function of the optical density or of the incident light. Thus, if light of an intensity of 100 foot candles produces an optical density of one and a transmission of 10 percent in a phototropic filter, a light intensity of 200 foot candles will produce an optical density of two and a transmission of only 1 percent. This sharp decrease in the transmission with an increase in intensity is often undesirable, especially in phototropic optical devices for eye-viewing, such as sunglasses.

It has been found that a more uniform variation of transmission with incident intensity can be achieved by combining an ultra-violet absorbing filter with the phototropic filter. The ultra-violet filter, by partially absorbing ultra-violet light without substantial absorption of visible light, improves the linearity of the relationship between the intensity of incident light and the optical density of the phototropic filter. The combination of filters permits more visible light to be transmitted than would otherwise be the case, essentially by decreasing the sensitivity of the phototropic filter to light incident on the combination. Thus, doubling the light intensity may decrease transmission to half the original transmission, for instance.

Ultra-violet absorbing substances are known in the art. For example, the ultra violet filters can be prepared using films containing 2,2'-dihydroxy-4-methoxy benzophenone, benzotriazole derivatives, phenyl salicylate, hydroquinone diethyl ether, 5-chloro-2-hydroxy benzophenone, etc.

Particularly useful embodiments are obtained by incorporating organic ultra-violet absorbing substances such as those described above directly into the phototropic composition of a phototropic filter. Because of the thickness of the filter and the intervening ultra-violet absorber, the phototropic component nearest the incident light is affected more strongly than that portion of phototropic substance farther from the light source. Again, non-linearities in the relationship between optical density and incident light intensity result, and a more direct proportionality between transmission and incident light intensity is achieved.

As in the case of phototropic filters not containing ultra-violet absorbers, a wide variety of concentrations can be employed depending on the effects desired. Both the concentration of the U.V. absorber, as well as of the phototropic substance, can be widely varied from between 0.1 percent by weight of the matrix used (e.g., film-forming compositions) to concentrations of 25 percent or more.

EXAMPLE 5

A phototropic filter containing an ultra-violet absorber is made by incorporating 1 percent by weight, based on the cellulose nitrate used, of phenyl salicylate into the film-forming composition described in Example 3 above. The film is cast onto a glass plate to give a phototropic filter whose optical density is nonlinear with respect to incident light.

In some cases, the same result obtained with a separate ultra-violet absorber can be accomplished by employing an excess of one component in a multi-component phototropic composition. Such is the case in redox systems in which an excess of one of the components may act as an ultra-violet filter. For example, an aqueous solution of meta-tungstic acid containing a dissolved organic hydroxy compound in less than an equivalent amount is of this type.

EXAMPLE 6

Polyvinyl butyral resin plasticized with a triethylene glycol-di-(2-ethyl-butyrate) plus crystal violet potassium cyanide is dissolved in ethylene glycol monoethyl ether This solution is coated onto a glass plate and allowed to dry. The resulting colorless film in 30 to 60 seconds exposure to the sun goes to a dark blue. This film can be laminated between glass or plastic sheets by means of heat and pressure to produce a phototropic sandwich.

EXAMPLE 7

A saturated aqueous solution of meta-tungstic acid in water, and containing a few drops of glycerine, is put in a transparent cell through one side of which light is shone. Viewed transversely to the path of the incident light beam, the solution in the cell turns dense blue in color near that face of the cell on which the light is incident. The color grades off in intensity to a colorless solution in portions farthest removed from the cell face on which the light is incident.

Although most of the phototropic compositions hereinabove described have been those showing a coloring in the light reaction (on exposure to visible or ultra-violet light) and a fading in the dark reaction, the present invention is not limited thereto. Many compositions exist in which the light reaction brings about a fading, and shielding from light redevelops the original color.

EXAMPLE 8

A film is prepared from the following components: 20 grams 10 percent aqueous polyvinyl alcohol solution; 15 drops 1 percent aqueous zinc-free Methylene Blue solution; 15 drops 10 percent aqueous ascorbic acid solution; 4 drops 100 percent sorbitol.

The film bleaches to a colorless condition after a 1½ minute exposure to light. On removal to the dark, a blue color develops. For protection against atmospheric oxidation, the film is preferably laminated between glass or plastic plates, or covered with a protective coating of a synthetic resin.

As mentioned earlier, the phototropic compositions and films described above can be used in a variety of device applications. In many of these, the phototropic film is used in combination with a transparent or opaque substrate. The nature of these combinations is made more clear by reference to the accompanying drawings, in which FIGURE 1 is a perspective view of an optical element comprising a substrate and a phototropic coating thereon;

FIGURE 2 is a perspective view, partly in section, of an optical element comprising a laminate of two laminae with a phototropic coating there between;

Figure 1:
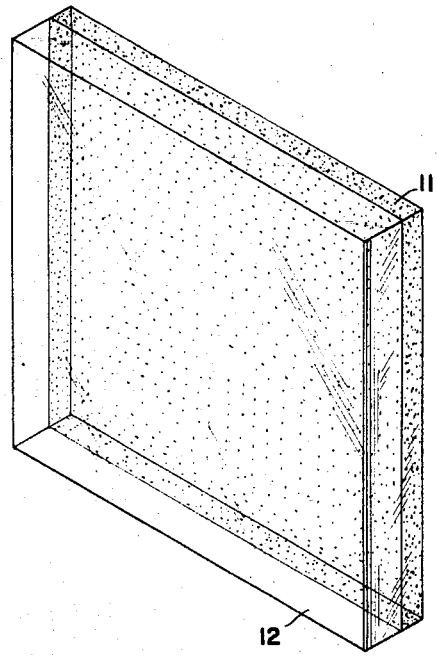

FIGURE 1 shows phototropic layer 11, either comprising a phototropic composition alone, or comprising a phototropic composition including a film-forming material such as described in Example 2 above, on substrate 12, which advantageously may be of a transparent substance such as quartz, glass or a plastic material such as a polyacrylate or polymethcrylate polymer. The resulting optical element is useful as a phototropic lens, as for sunglasses which automatically decrease the percent transmission of some or all of the light incident thereon as the intensity of radiation (or some part of it) varies, or as a photographic filter which automatically adjusts itself to reduce percent transmission as incident intensity increases, or vice versa, or as a screen for use in projection of cathode-ray, radar, or microscope images having patterns of varying incident intensity.

Figure 2:
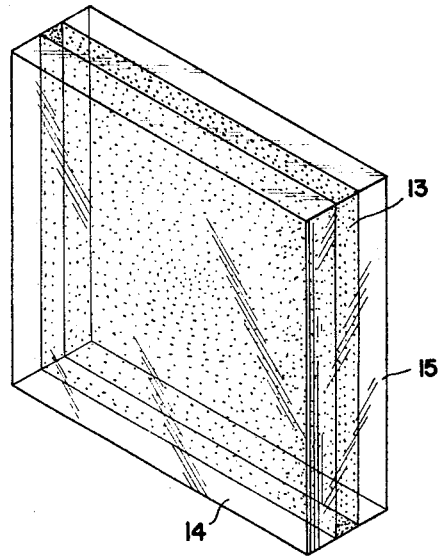

FIGURE 2 shows phototropic layer 13 between two laminae 14 and 15 of transparent glass or plastic. Such an embodiment is particularly useful in windows for the home, office, or factory or in vehicles and aircraft to avoid impaired visibility by reason of excessive brightness in spots, or in temporary flare-ups, as well as for lenses, filters, and projection screens. The laminae 14 and 15 need not be of the same material, and often advantageously are of different materials. Thus, if light is incident on layer 14 this layer should not absorb light frequencies, e.g., ultra-violet, to which phototropic layer 13 is responsive. Similarly lamina 15 may be made of a material having a high U.V. absorption, for example to protect the eye when viewing through the laminated structure. That lamina through which light from phototropic layer 13 passes may also be tinted or infra-red absorptive.

Figure 3:
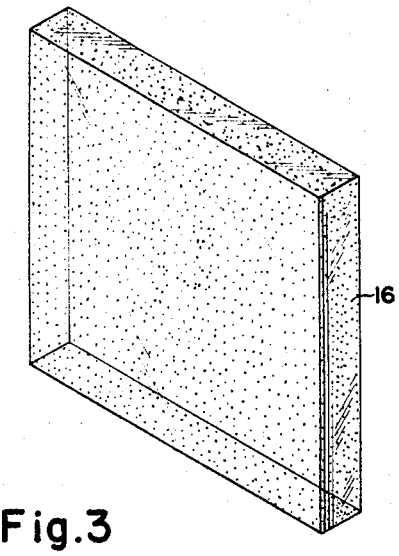
FIGURE 3 is a perspective view of an optical element comprising a phototropic substance incorporated in a transparent matrix.

FIGURE 3 shows transparent optical element 16 comprising a transparent matrix, for example of plastic, into which a phototropic composition has been mixed. An embodiment of this kind is useful in making phototropic filters, and films for use as screens, shades, and so forth. The matrix material can be made rigid or flexible and in a variety of thicknesses.

Any of the embodiments shown in the drawings is useful in the manufacture of sunglases or eye shades which accommodate to light incident thereon. In such applications, a phototropic material having a broad absorption band and a neutral color, like that in Example 4, is preferred. The transmission of such glasses advantageously varies from about 10 percent, for example in bright sunlight, to 90 percent in full shadow. An appropriate period, advantageously about 20 seconds, for accommodation from the fully opened to fully closed positions, or vice versa, is useful. Shorter reaction times may tend to give flickering when the light source was rapidly variable, for example when driving in bright sunlight through the shadows of trees or buildings along the roadway.

The density of the phototropic filter is desirably normal at a level where the intensity of light meeting the eye is between 50–100 foot candles, at which the eye has maximum sensitivity.

Phototropic filters can also be used in glasses designed to protect the eye from damage by high intensity light. In such a protective device, rapid response is desirable, e.g., the density of the phototropic filter should reach a density of 2–4 before eye damage results. If this minimum level is achieved, and if there is sufficient phototropic material available for further darkening, the increasing density of the filter will protect the eye against still further increases in the intensity of incident light.

All these devices are conveniently made from either a simple plastic sheet, as shown in FIGURE 3, or from a laminate, as shown in FIGURE 2, which may be heat welded or cemented together, or from a coated lens of a type shown in FIGURE 1.

In the construction of glasses and shields in which there is a nonphototropic substance between the incident light and a phototropic layer, the intervening material is permeable by radiation of frequencies which activate the phototropic reaction. Styrene and acrylate polymers are preferred carrier materials since they are highly transparent to ultra-violet, the wavelengths of which are primarily inducive of phototropy. To speed the dark reaction, which may, for example, proceed under infra-red radiation, a nonphototropic infra-red absorber may be combined into the phototropic layer.

Many of the considerations mentioned for eye shields apply also to phototropic filters for photography. Such a filter can accomplish the same results as the mechanically operated iris now in use, or multiple interchangeable filters, and does, by a simple, directly automatic effect, the work of a photocell-operated iris.

A phototropic filter of this type is of prime interest when placed outside the focal plane. Advantageously, it should be shielded so that the only light reaching it is that coming from the area being photographed (or its incident illumination). It may be placed before or behind or within optical systems now in use. To minimize Fresnel losses, a phototropic coating is conveniently placed directly on a lens element already present in the optical system.

By using compositions, as herein disclosed, which are of neutral shades, absorbing uniformly throughout the spectrum, a uniform control of intensity is achieved, and tonal values, even in color photography, are maintained. The filters have the additional advantage of not introducing or intensifying "grain" effects in the recorded image.

It is desirable that the filter adjust density rapidly, within a few seconds. Longer accommodation times are practical for many kinds of photography, however. Complete shut-off by the filter is not necessary in photographic applications, and a minimum transmission of 10 percent is quite satisfactory.

Placement of a phototropic filter out of the focal plane brings about a uniform control of light reaching the focal plane. However, a phototropic material may also be placed in the focal plane, for example, as a coating on, or cover over, the photographic film or plate used. In such a position, the phototropic reaction can be used to affect contrast in the image. A phototropic film which darkens in the light reaction will give photographic negatives of reduced contrast. Conversely, increased contrast is achieved by using a phototropic composition which bleaches in the light reaction.

Phototropic screens have a variety of uses. For example, a translucent screen filmed with, or incorporating, phototropic substances can be used in radar tracking. The screen is normally white lighted, for example, and dark patterns are traced by impingement on the screen of an ultra-violet light beam coordinated with the radar signal. This system has the advantage over prior art systems of giving an image the intensity of which is dependent on the intensity of the impinging beam and the time period of impingement. The patterns produced may be erased in whole or part by irradiation with infra-red.

A similar system is useful in microscopy. The short wave lengths of ultra-violet (below 4000 A.) are particularly suitable for giving good definition at high magnification. An ultra-violet image produced by microscope optics is thus adaptable to high magnification by projection.

In vehicle and aircraft windshields, phototropic films give protection against the glare of sunlight, and are adaptable to reducing glare from the headlights of oncoming vehicles. A driver-controlled ultra-violet lamp which shines on the windshield is activated to increase the optical density of the shield. Alternatively, a photocell activated by oncoming headlights is used to light the U.V. source. The screen returns rapidly to the highly transmitting stage on extinguishing the U.V. source.

Coated glass or plastic or plastic laminates made with phototropic films are advantageously used in fenestration. Since even reflected sunlight contains an ultra-violet component, phototropic windows are adaptable to all exposures. Since artificial illumination generally contains little ultra-violet, the windows are unaffected by internal illumination.

For conversion of existing fenestration to a phototropic variety, screens or flexible shades made of a plastic film containing a phototropic composition can be used. The films can be hung as drapes or curtains, or applied directly to a transparent or translucent pane using an adhesive. Alternatively slats or blinds giving phototropic reactions are convenient.

Other applications of the phototropic phenomenon are in the manufacture of three dimensional displays. Parallel spaced phototropic films side-illuminated at an angle by individual ultra-violet sources are used to give a three-dimensional picture when front-viewed through the series of parallel films.

True three-dimensional effects are achieved using a mass of transparent phototropic-reacting substance, for example a quiescent solution containing dissolved phototropic substances, or a clear plastic block containing dissolved or dispersed phototropic compositions. A plurality of ultra-violet light beams projected into the mass from different directions produces patterns within the mass. For example, if a beam from a standard source produces an optical density of 1 within the mass, and a corresponding transmission of 10 percent, the intersection of this beam with another beam of equal intensity will give an optical density of 2 at the point or line of intersection. At a density of 2, the transmission is inversely logarithmically reduced to only 1 percent, giving a readily perceptible contrast in transmitted visible light. Complex images are produced by increasing the number of U.V. light sources. The images produced can be left, or can be made to fade slowly or rapidly by control of the dark reaction with infra-red light, for example.

A phototropic film on an opaque, translucent, or transparent backing, or in a homogeneous sheet can be used to store information registered thereon by ultraviolet "printing" or "writing." These films can be stored, used or reused at will, or erased immediately and find application in computing devices and other devices where a memory element is employed.

Although specific embodiments have been shown and described, it is to be understood that they are illustrative and are not to be construed as limiting on the scope and spirit of the invention.

We claim:

1. A phototropic composition colorless in its unirradiated condition and reversibly forming color on exposure to radiation, said composition consisting essentially of a plurality of phototropic bis(p-aminophenyl)vinyl carbonium polymethine dyestuffs colorless in their leuco form and having complementary colors in their colored state, said dyestuffs being present in said composition in amounts imparting a chromatically neutral absorption to said composition on exposure to activating radiation.

References Cited

UNITED STATES PATENTS

| | | | |
|---|---|---|---|
| 2,710,274 | 6/1955 | Kuehl | 88—61 |
| 1,678,218 | 7/1928 | Gruss | 88—107 |
| 2,895,892 | 7/1959 | Chalkley | 88—106 |
| 2,953,454 | 9/1960 | Berman | 88—106 |
| 1,845,835 | 2/1932 | Frankenburger et al. | 88—106 |
| 2,305,799 | 12/1942 | Vierling | 88—106 |
| 2,735,783 | 2/1956 | Tamblyn et al. | 88—106 |
| 2,921,407 | 1/1960 | Wagner et al. | 88—106 |
| 2,533,426 | 12/1950 | Carrol et al. | 96—104 |
| 2,813,802 | 11/1957 | Ingle et al. | 117—33.3 |
| 2,992,938 | 7/1961 | McCarville et al. | 117—33.3 |
| 3,020,406 | 2/1962 | Whitney | 88—106 |
| 3,085,469 | 4/1963 | Carlson | 88—61 |
| 1,657,776 | 1/1928 | Wolfe et al. | 252—300 X |

FOREIGN PATENTS 521,268  3/1955  Italy.

RICHARD D. LOVERING, *Primary Examiner.*

U.S. Cl. X.R.

96—90; 117—33.3; 350—160, 311, 312